US012611643B2

(12) United States Patent
Aldrich

(10) Patent No.: US 12,611,643 B2
(45) Date of Patent: Apr. 28, 2026

(54) MIXING APPARATUS

(71) Applicant: EZ-Pro Texture Inc., Corona, CA (US)

(72) Inventor: Jim Aldrich, Tustin, CA (US)

(73) Assignee: EZ-Pro Texture Inc., Corona, CA (US)

( * ) Notice: Subject to any disclaimer, the term of this patent is extended or adjusted under 35 U.S.C. 154(b) by 675 days.

(21) Appl. No.: 18/062,057

(22) Filed: Dec. 6, 2022

(65) Prior Publication Data

US 2023/0415110 A1 Dec. 28, 2023

Related U.S. Application Data

(60) Provisional application No. 63/367,027, filed on Jun. 24, 2022.

(51) Int. Cl.

*B01F 33/501* (2022.01)
*B01F 27/07* (2022.01)
*B01F 27/1123* (2022.01)

(52) U.S. Cl.

CPC ...... *B01F 33/50115* (2022.01); *B01F 27/071* (2022.01); *B01F 27/1123* (2022.01)

(58) Field of Classification Search

CPC ............ B01F 33/50115; B01F 27/1123; B01F 27/0542; B01F 27/054

See application file for complete search history.

(56) References Cited

U.S. PATENT DOCUMENTS

| | | | | |
|---|---|---|---|---|
| 3,204,283 A * | 9/1965 | Damron | B65D 51/32 366/244 |
| 3,326,533 A * | 6/1967 | Sturrup | B01F 35/4111 416/240 |
| 6,247,837 B1 * | 6/2001 | Wardberg | B01F 33/50115 366/129 |
| 6,419,385 B1 * | 7/2002 | Walls | B44D 3/08 366/605 |
| 2017/0232408 A1 * | 8/2017 | Jobling | B01F 27/0542 366/64 |
| 2017/0304788 A1 * | 10/2017 | Grover | B01F 27/054 |
| 2020/0262692 A1 * | 8/2020 | Raymond | B01F 33/50115 |

FOREIGN PATENT DOCUMENTS

| | | | |
|---|---|---|---|
| DE | 202020100017 U1 * | 2/2020 | B01F 33/50115 |
| EP | 2638955 A1 * | 9/2013 | B01F 33/50115 |

* cited by examiner

*Primary Examiner* — Marc C Howell
(74) *Attorney, Agent, or Firm* — DANE IP Law PC

(57) ABSTRACT

A mixer is provided having two tines. These tines have a bulbous configuration and can be traversed between an outward biased position and a compressed inward position. The tines are bendable. When distal ends of the tines are pushed against an inner surface of the container, the tines criss cross so that the distal end portions of the tines rub or scrape the bottom surface of the container.

19 Claims, 17 Drawing Sheets

MIXING APPARATUS

STATEMENT RE: FEDERALLY SPONSORED RESEARCH/DEVELOPMENT

The present application is a continuation of U.S. Prov. Pat. App. Ser. No. 63/367,027, filed on 2022 Jun. 24, the entire contents of which is expressly incorporated herein by reference.

BACKGROUND

The various aspects and embodiments described herein relate to an apparatus for mixing liquid.

This application is related to the Application Ser. No. 63/367,027, filed on Jun. 24, 2022, the entire contents of which is expressly incorporated herein by reference.

During the construction of a building, many liquids are used such as paint, spackling, grout mixed with water, and orange peel knock down texture. These are examples of liquids used in the building industry. Unfortunately, these liquids if they remain still may tend to clump up and require mixing before use. They may remain still for a prolong period due to inactivity on a job site and storage for later emergency use by a homeowner. In other situations, powder must be mixed with water to formulate a compound such as grout or orange peel knock down texture. In all of these situations, the liquid must be thoroughly mixed before use.

There is a need in the art to improve the apparatus and methods of mixing liquids.

BRIEF SUMMARY

A mixer is providing which may be attached to various rotating machines including but not limited to an impact drill, a rotary drill, a food mixing machine (e.g., blender). The mixer has an attachment portion which is used to secure the mixer to the rotating machine. The attachment portion may be configured as a shank for attaching the mixer to a rotary drill, a tang for attaching the mixer to an impact drill or other configuration for attaching the mixer to the food mixing machine. The mixer may also have a middle portion and first and second tines. The middle portion is attached to the attachment portion. The first and second tines have bases which are attached to each other and the middle portion. The attachment portion, middle portion and the first and second tines are symmetrical about a rotating axis. The rotating axes of the attachment portion, middle portion and the first and second tines are coaxially aligned to each other. Moreover, the attachment portion, middle portion and the first and second tines are fabricated from a unitary material.

The mixer may be attached to the rotating machine. After being attached, the mixer is disposed within a container having a liquid therein for mixing. The rotating machine rotates the mixer within the liquid. The tines cut through the liquid so that any clumps of material that is floating within the liquid is broken down. After mixing, the liquid will have a heterogenous consistency greater than before mixing was performed with the mixer. The mixer may be pushed closer to the inner surface of the container. At which time, the tines will criss cross so that distal end portions of the tines scrape the inner surface of the container and lift clumps of solidified particles up and into a bulbous portion of the tines to further breakdown the clumps to increase heterogeneity of the liquid in the container.

In an aspect, a mixer for mixing liquid contents within a container is disclosed. The mixer may comprise first and second tines and a proximal end portion. The first and second tines may be formed in a biased outward position. The first and second tines may be fabricated from a bendable material. Bases of the first and second tines may be attached to each other. Distal ends of the tines may be closer to each other compared to a midpoint of the tines. The proximal end portion may be attached to bases of the first and second tines.

The tines may be fabricated from a polyethylene material.

The tines may be traversable between a biased outward position and a fully compressed inward position. A width of the tines at a midpoint of the length of the tines when the tines are at the biased outward position may be between 1 inch and 10 inches. A width of the tines at the midpoint of the length of the tines when the tines are at the fully compressed inward position may be between ⅛ inch and 3 inches.

The distal ends of the tines may have a bulbous configuration.

A length of the first tine may be equal to a length of the second tine.

The mixer may further comprise a shank attached to the bases of the first and second tines. The shank may be sized and configured to be received and fixed to jaws of a drill chuck.

The mixer may further comprise a tang attached to the bases of the first and second tines. The tang may be sized and configured to be received and fixed to jaws of an impact drill.

The first and second tines may have a smooth outer surface to mitigate marring or cutting the container during mixing.

In another aspect, a method of mixing liquid in a container is disclosed. The method may comprise the steps of providing a rotating machine having a chuck; providing a mixer; attaching a proximal end portion of the mixer to the chuck of the rotating machine; disposing the mixer into the container filled with the liquid; and rotating the mixer with the rotating machine to mix the liquid in the container.

In the providing the mixer step, the mixer may comprise first and second tines which are formed in a biased outward position. The first and second tines may be fabricated from a bendable material. Bases of the first and second tines may be attached to each other. Distal ends of the tines may be closer to each other compared to a midpoint of the tines. The mixer may further comprise a proximal end portion which may be attached to bases of the first and second tines.

The method may further comprise a step of pressing the distal ends of the tines against an inner surface of the container.

The method may further comprise the step of varying pressure of the distal ends of the tines against the inner surface of the container for criss crossing the tines to varying degrees.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 9:
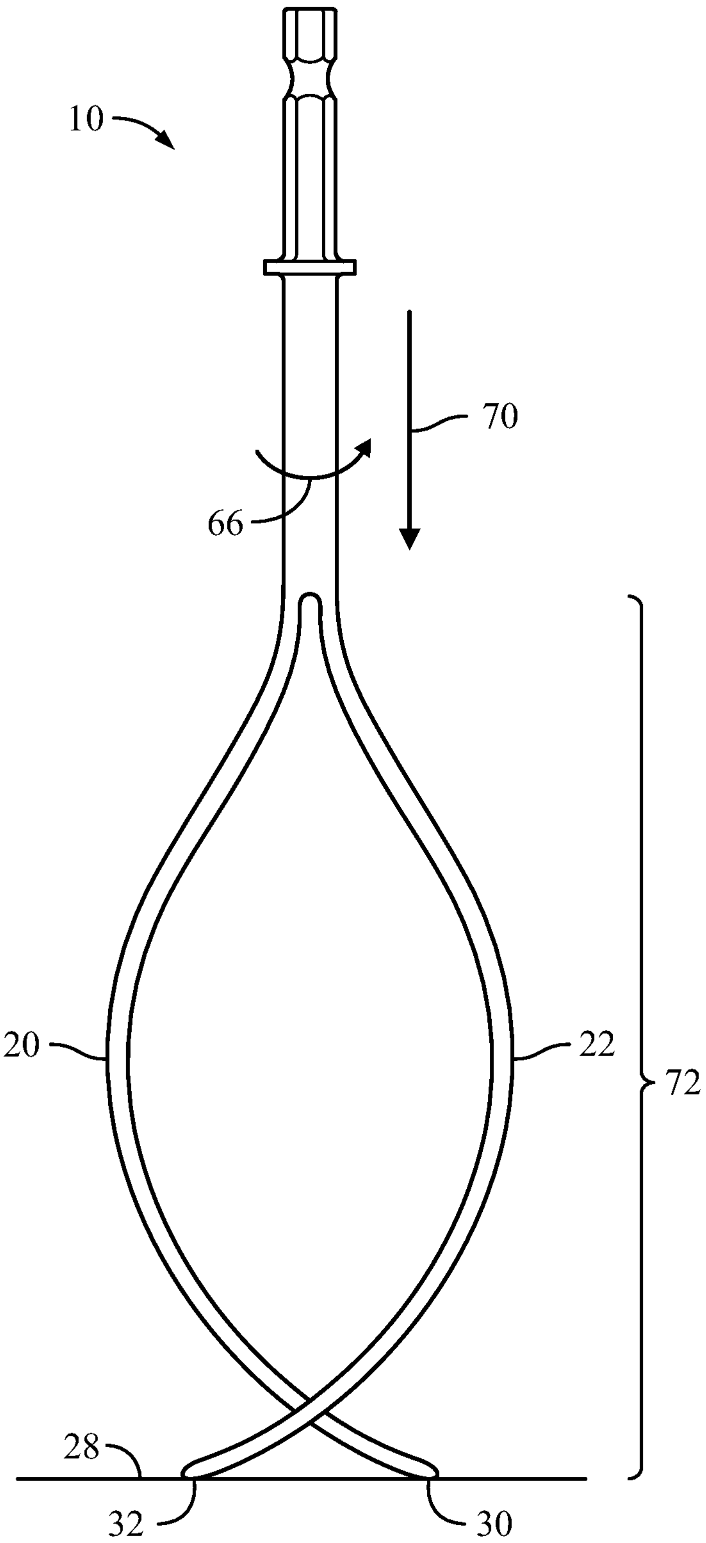
FIG. 9 illustrates the tines of the mixer crisscrossing as a slight downward pressure is applied to the surface by the mixer and the mixer is rotated in a clockwise direction.
Figure 10:
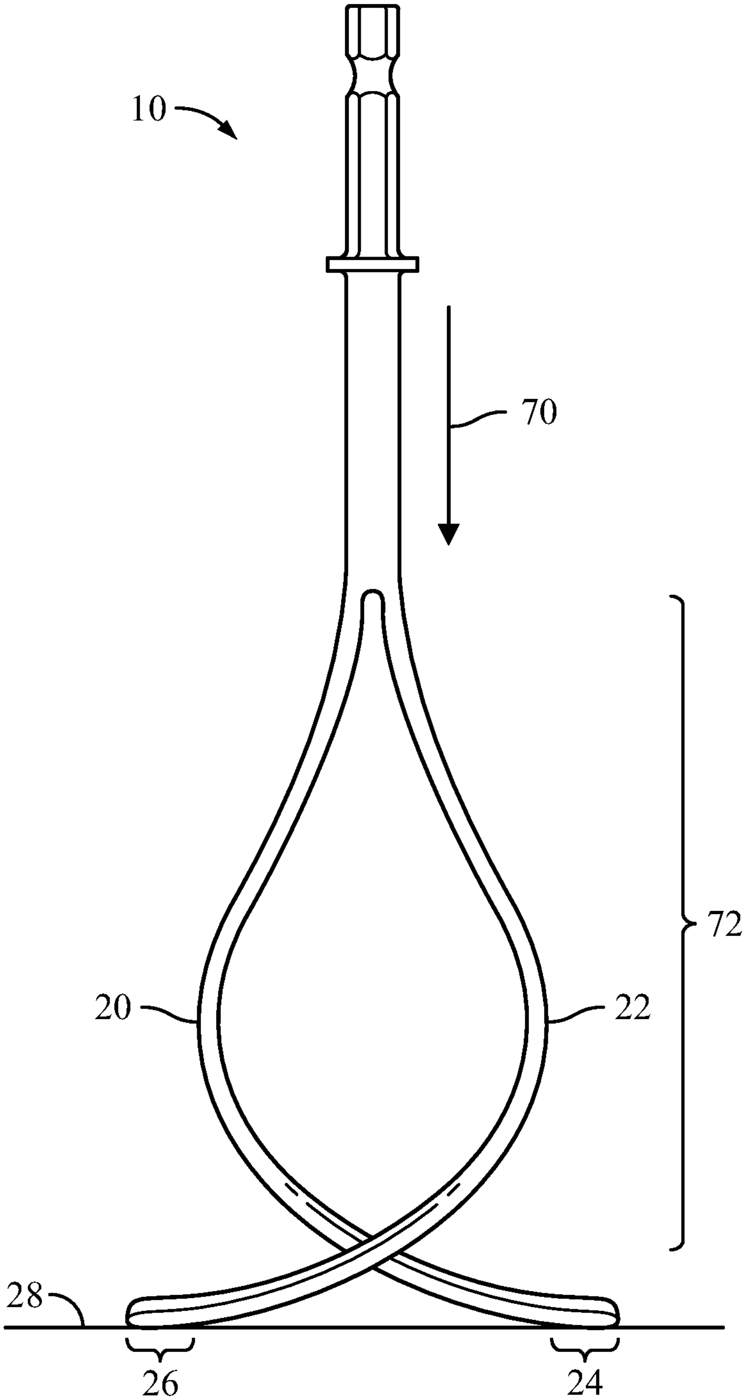
FIG. 10 illustrates the tines of the mixer further crisscrossing as increased downward pressure is applied to the surface by the mixer while the mixer is rotated in a clockwise direction.

Referring now to the drawings, a mixer 10 is disclosed. The mixer 10 may have a proximal end portion 12 and a distal end portion 14. The proximal end portion 12 may be attachable to a drill to rotate the distal end portion 14 in a container 16 (FIG. 11) containing liquid 18 (e.g., joint compound, paint) to thoroughly mix the liquid 18 as the distal end portion 14 rotates in the liquid. The distal end portion may have at least two (2) tines 20, 22 which have a bulbous configuration (i.e., bowed out) and free distal end portions 24, 26. The free distal end portions 24, 26 may be pushed against a bottom surface of the container 16. In this instance, the tines 20, 22 may crisscross as shown in FIGS. 9 and 10. The distal ends 30, 32 of the tines 20, 22 may rub against the bottom surface 28 of the container 16 to scrape off any hardened contents on the bottom surface 28 of the container. This liquid and material are urged upwards. The tines 20, 22 mix the liquid 16 within the container 16 and break apart any semi solidified content within the container.

The mixer may be used to mix liquid which may include but is not limited to paint in a can, ready mix drywall texture in a bag, and food in a container.

Figure 2:
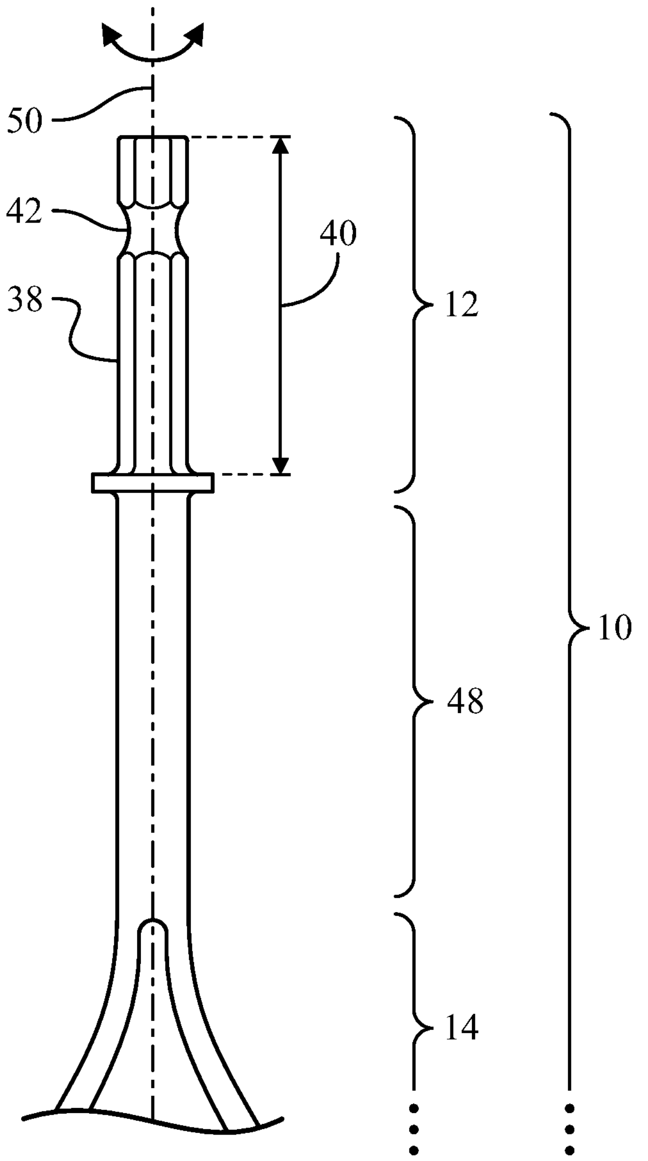
FIG. 2 is an enlarged front view of a proximal end portion of the mixer shown in FIG. 1 for securing the mixer to a device for rotating the mixer.

Referring now to FIG. 2, the proximal end portion 12 may be configured to attach to a chuck 34 of a drill 36. In particular, the proximal end portion 12 may have six equal sides 38 and be approximately greater than one and one half-inch in length 40. The length 40 may be ½ inch to inches but is preferably 1½ inches. Additionally or alternatively, the proximal end portion 12 may have a groove so that the proximal end portion 12 is sized and configured to fit within a receiving chuck 44 of an impact drill 46. The proximal end portion 12 may be attached to the distal end portion 14 via a shaft 48. The shaft 48 and the proximal end portion 12 may be coaxially aligned to each other. They 48, 12 may define a rotational axis 50 of the mixing apparatus 10. The mixer 10 may be attached to different types of rotation devices (e.g., drills, impact drills, food mixing devices) via different chucks including but not limited to 3 jawed chucks and quick release chucks.

Figure 3:
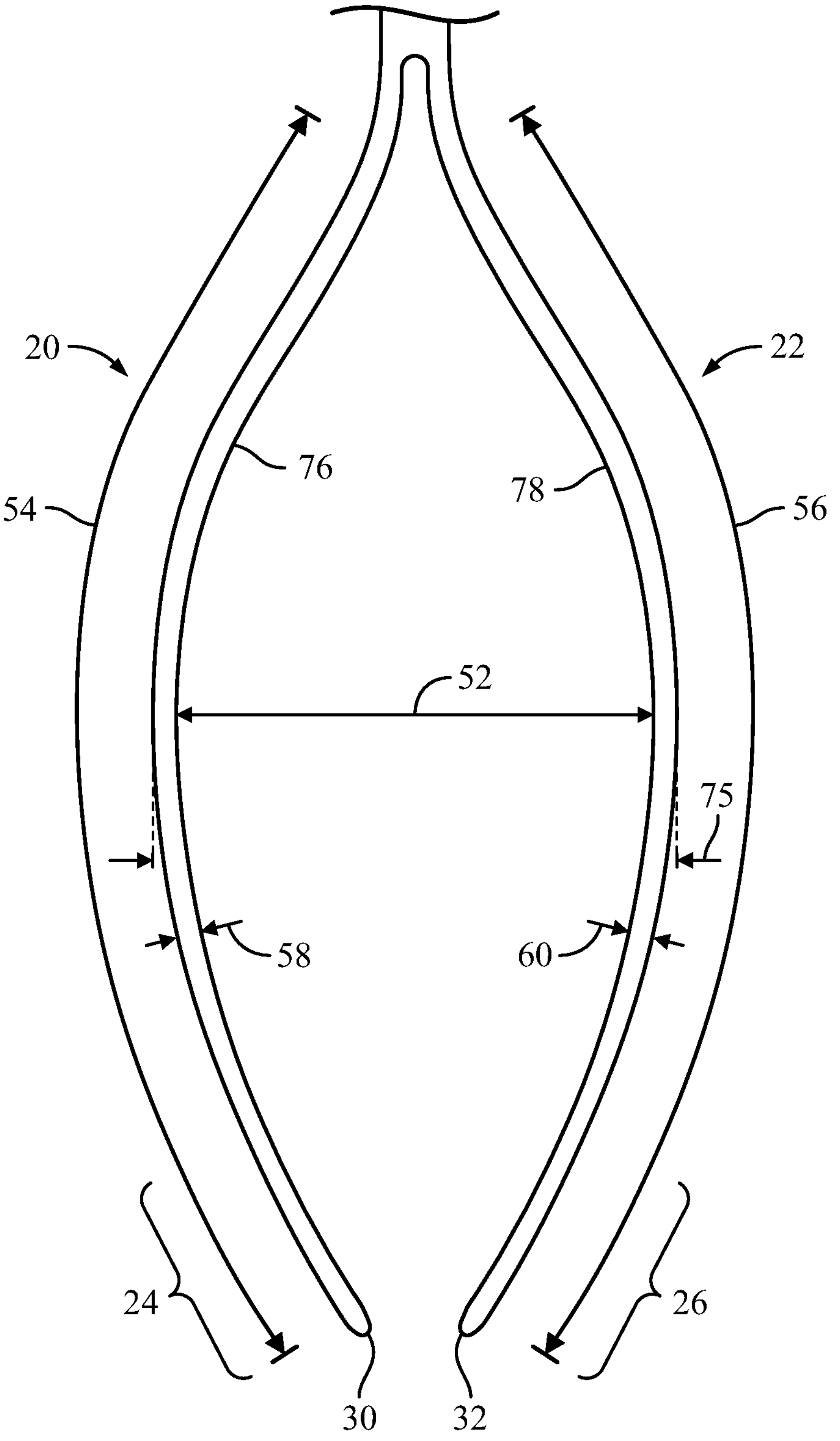
FIG. 3 is an enlarged front view of the tines of the mixer shown in FIG. 1 for mixing liquid contents (e.g., joint compound) within a container.
Figure 15:
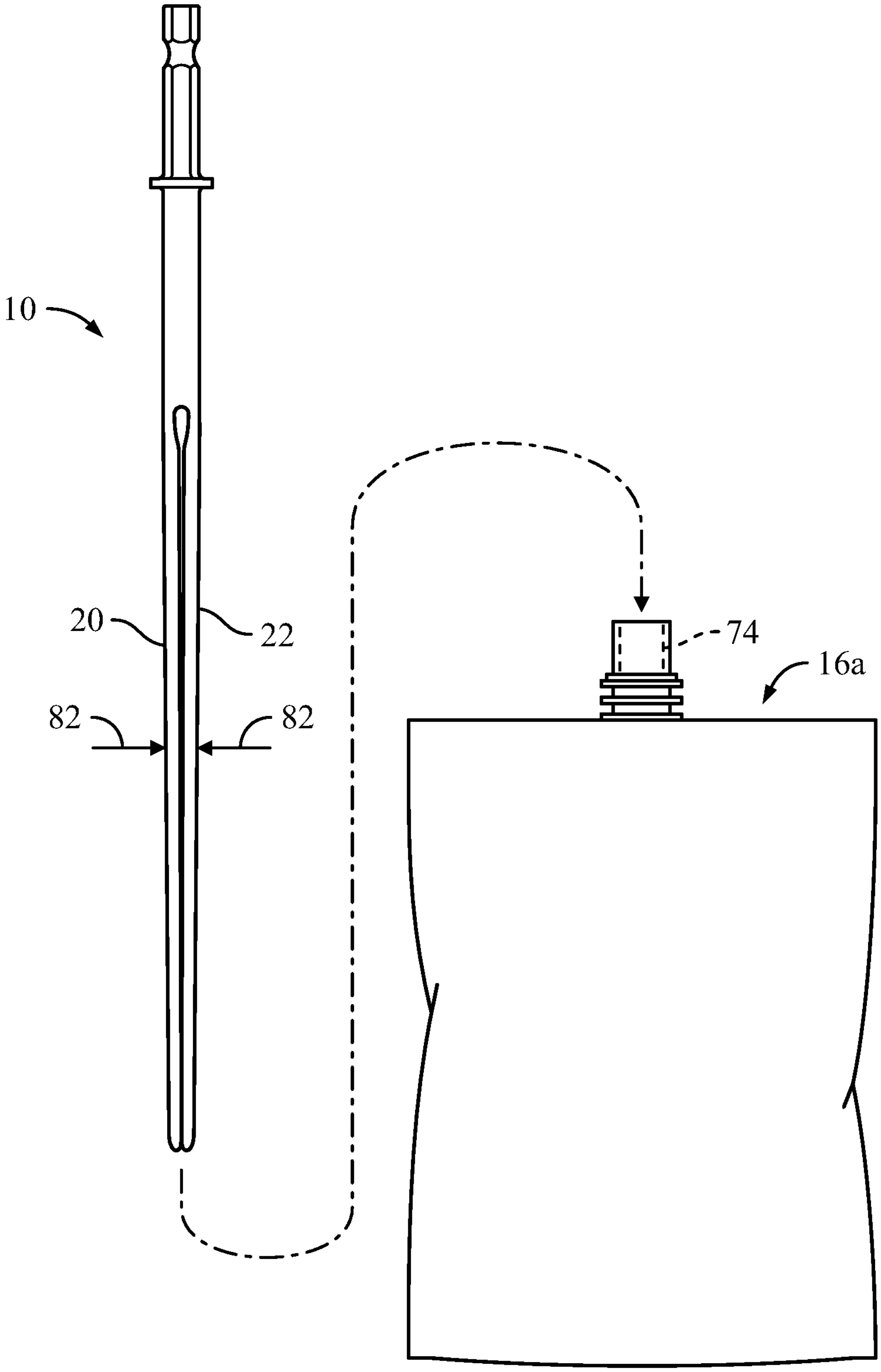
FIG. 15 illustrates a step of squeezing the tines together for preparation of insertion of the tines into a small opening of a container to mix liquid within the container.
Figure 16:
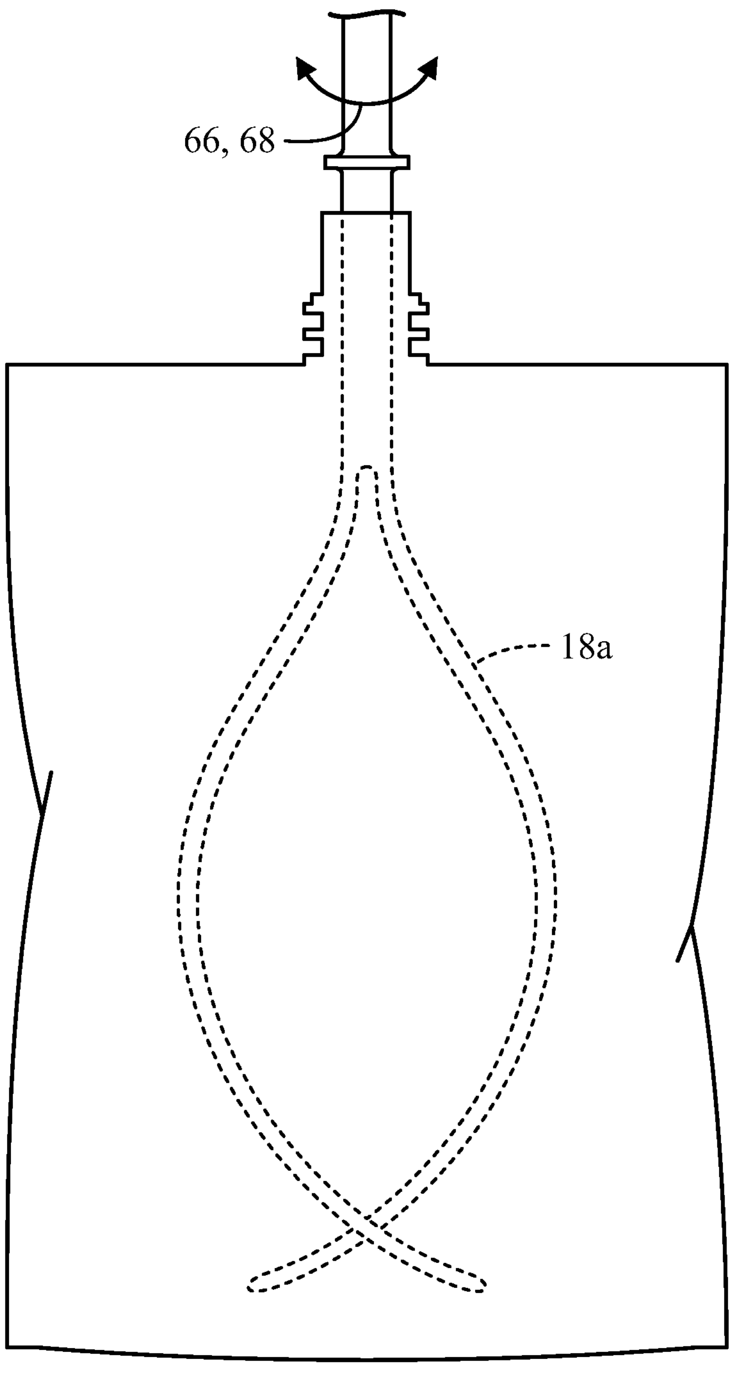
FIG. 16 illustrates the mixer inserted into the container (i.e., bag) shown in FIG. 15 so that upon rotation of the mixer, the liquid contents of the container is mixed.

Referring now to FIG. 3, the tines 20, 22 may have a bulbous configuration. In particular, a distance 52 at a midpoint of its length 54, 56 may be about two inches. The distance 52 may be between ½ inch to 24 inches but is preferably 2 inches. The length 54, 56 of the tines 20, 22 may be about six inches. The length 54, 56 may be between 2 inches and 24 inches and is preferably six inches. The tines 20, 22 may have a curved bulbous configuration. The tines 20, 22 may be biased to this bulbous curved configuration. As such, when the user pushes down on the mixing apparatus 10, the tines 20, 22 may bend as shown in the progression in FIGS. 8-10. Additionally, as shown in FIG. 15, the tines may be pushed together so that the tines 20, 22 may be inserted into a hole having a diameter greater than a sum of the thicknesses 58, 60 of the tines 20, 22. After the tines are inserted into the small diameter hole, the tines may spring outward because the tines are biased to the curved configuration. The user may then rotate the mixer 10 to mix the liquid contents within the container having a small diameter hole.

Figure 1:
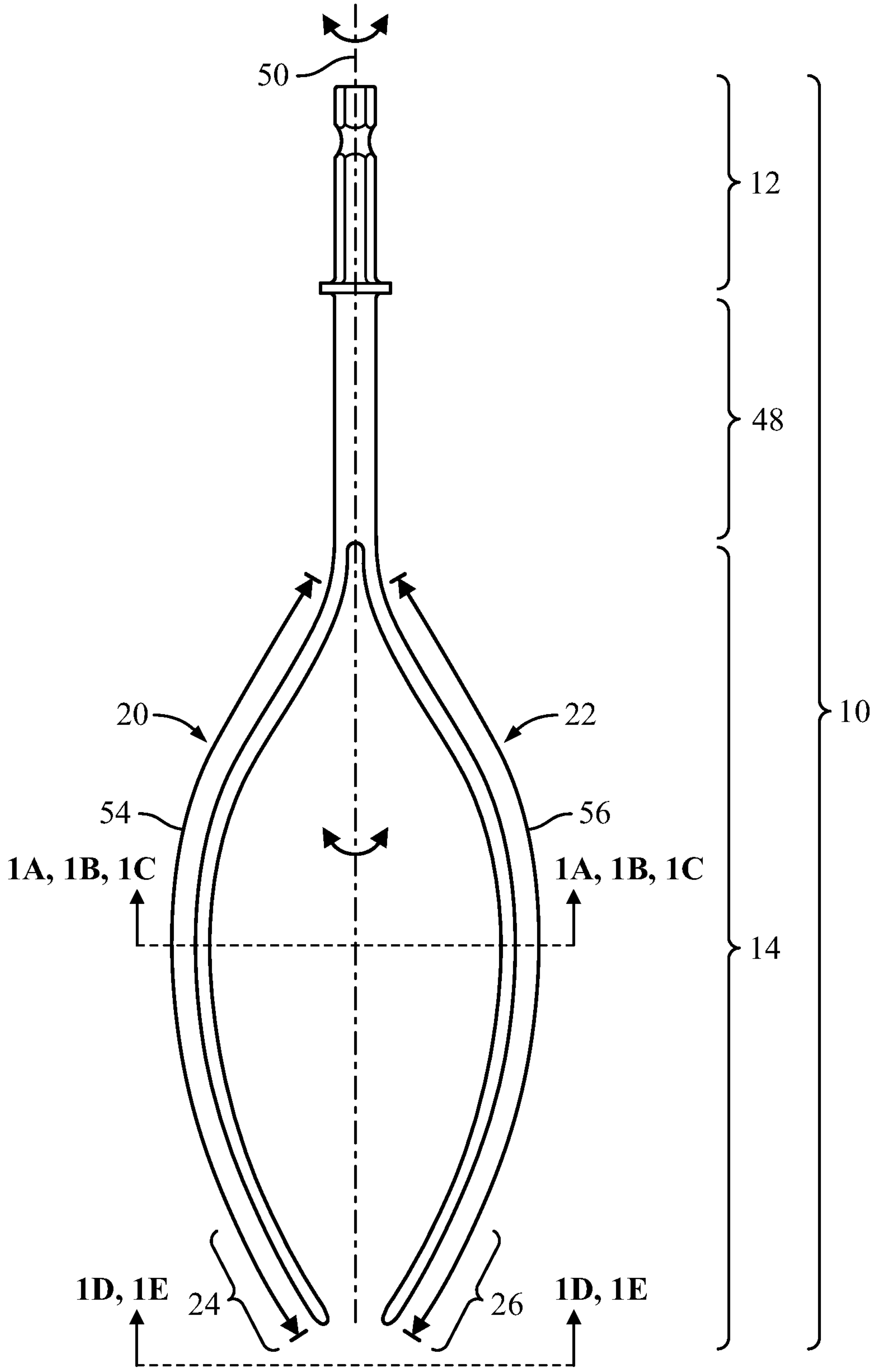
FIG. 1 is a front view of a mixer.
Figure 1A:
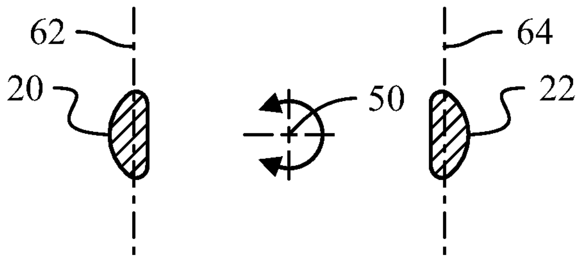
FIG. 1A is a cross sectional view of tines of the mixer shown in FIG. 1.
Figure 1B:
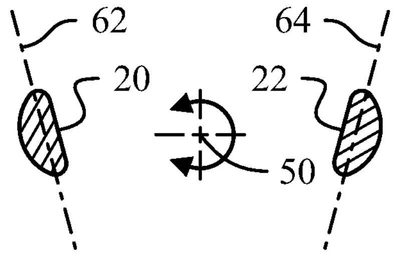
FIG. 1B is a cross sectional view of an alternative embodiment of the tines of the mixer shown in FIG. 1.
Figure 1C:
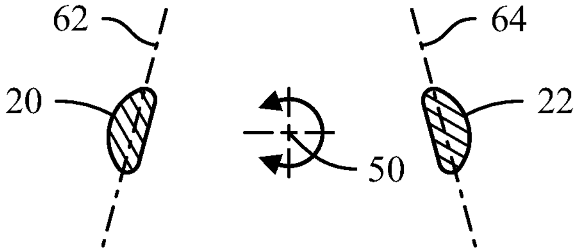
FIG. 1C is a cross sectional view of a further alternative embodiment of the tines of the mixer shown in FIG. 1.
Figure 1D:
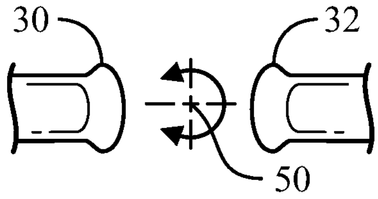
FIG. 1D is a bottom view of distal end portions of the tines of the mixer shown in FIG. 1.
Figure 1E:
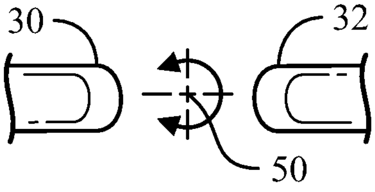
FIG. 1E is a bottom view of an alternate embodiment of the tines of the mixer shown in FIG. 1.

Referring now to FIGS. 1A-1C, a cross-sectional configuration of the tines 20, 22 is shown. The tines may have various configurations including but not limited to circular, oval, triangular, polygonal and elliptical. The cross-sectional configuration shown in FIGS. 1A-1C illustrates an elliptical cross-sectional configuration. However, the various aspects described in relation to the elliptical cross-sectional configuration may be applied to the other cross sectional configurations. In FIG. 1A, the elliptical cross-sectional configuration may have a length direction shown by direction 62, 64. The directions of the elliptical cross-sectional configuration may be parallel with each other as shown in FIG. 1A, skewed outward with each other shown in FIG. 1B and skewed inward as shown in FIG. 1C. When the tines 20, 22 rotate within the liquid 16, depending on the configuration, the tines may push the liquid further outward toward the sidewalls of the container, further inward away from the sidewalls of the container or a combination thereof. It is also contemplated that one of the tines 20, 22 may be splayed inward while the other tine 20, 22 may be displayed outward. The tines 20, 22 may be devoid of any sharp surface or edge to mitigate marring of the container inner surfaces or puncturing or cutting of the container upon contact of the tines 20, 22 with the container 16. Moreover, the distal ends may have a configuration (i.e., smooth) which prevents or mitigates puncturing, marring or otherwise damaging of the inner surface (e.g., sidewall or bottom surfaces) of the container 16. In particular, as shown in FIG. 1D, the distal end 30, 32 may have a bulbous configuration as shown in FIG. 1E, the distal ends 30, 32 may have a curved distal end.

Figure 4:
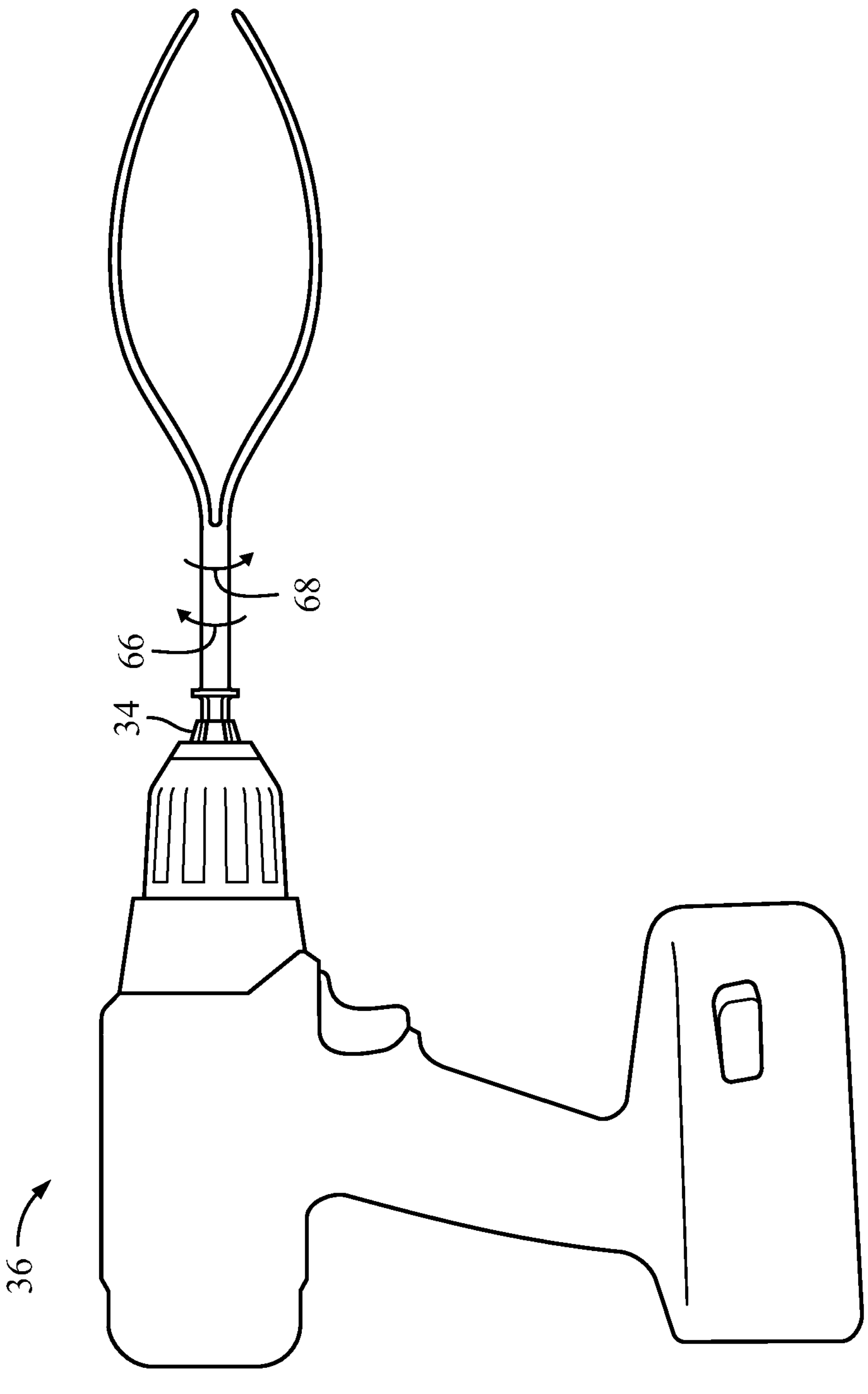
FIG. 4 illustrates the mixer shown in FIG. 1 attached to a drill.
Figure 5:
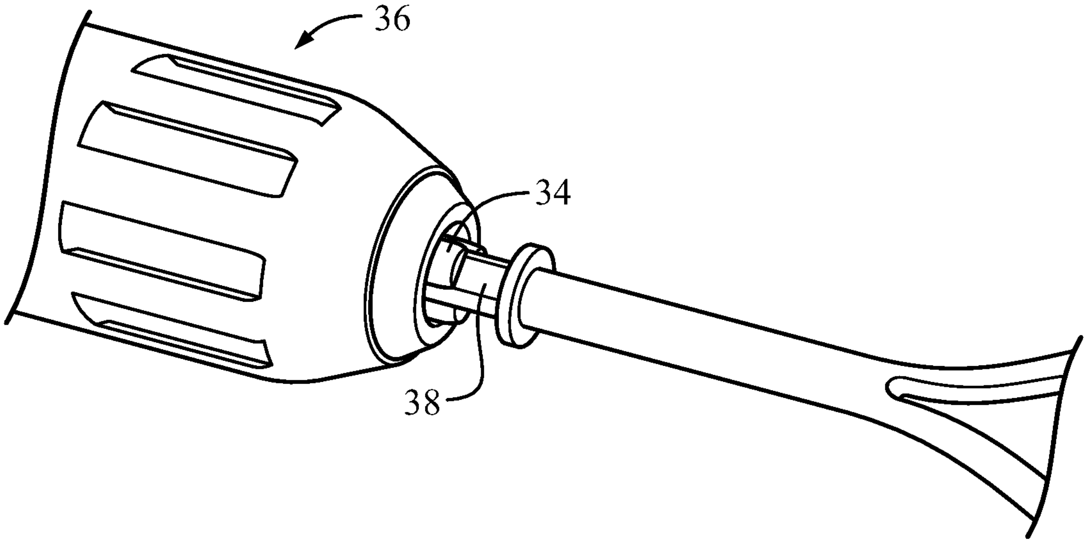
FIG. 5 is an enlarged view of the mixer being attached to the drill shown in FIG. 4.

Referring now to FIG. 4, the proximal end portion 12 may be attached to a chuck 34 of a drill 36. After the mixer 10 is attached to the drill 36, the mixer 10 may be rotated in either the clockwise direction 66 or the counterclockwise direction 68 depending on whether the drill is set to the clockwise or counterclockwise rotational direction. FIG. 5 illustrates the chuck 34 of the drill 36 engaging three of the sides of the proximal end portion 12.

Figure 6:
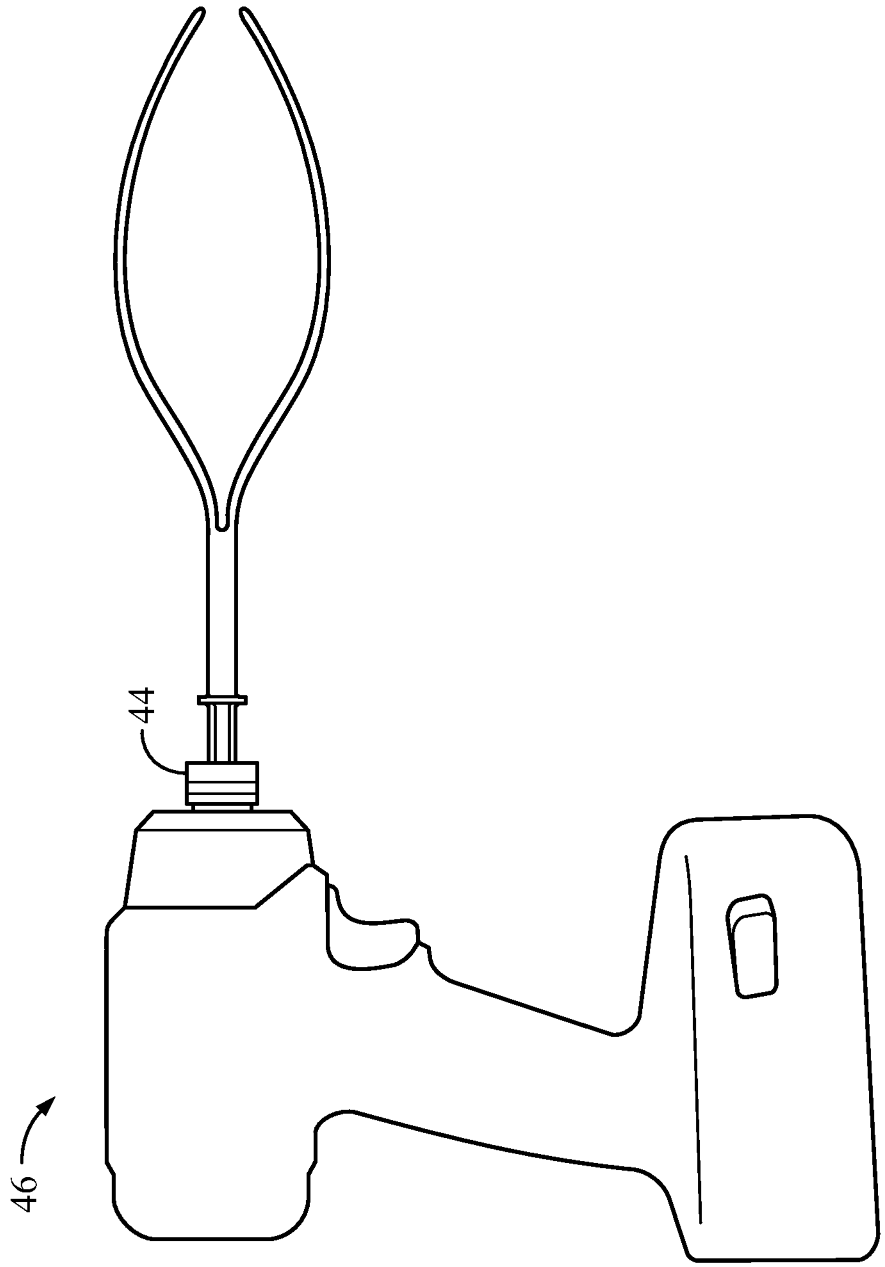
FIG. 6 illustrates the mixer shown in FIG. 1 attached to an impact drill.
Figure 7:
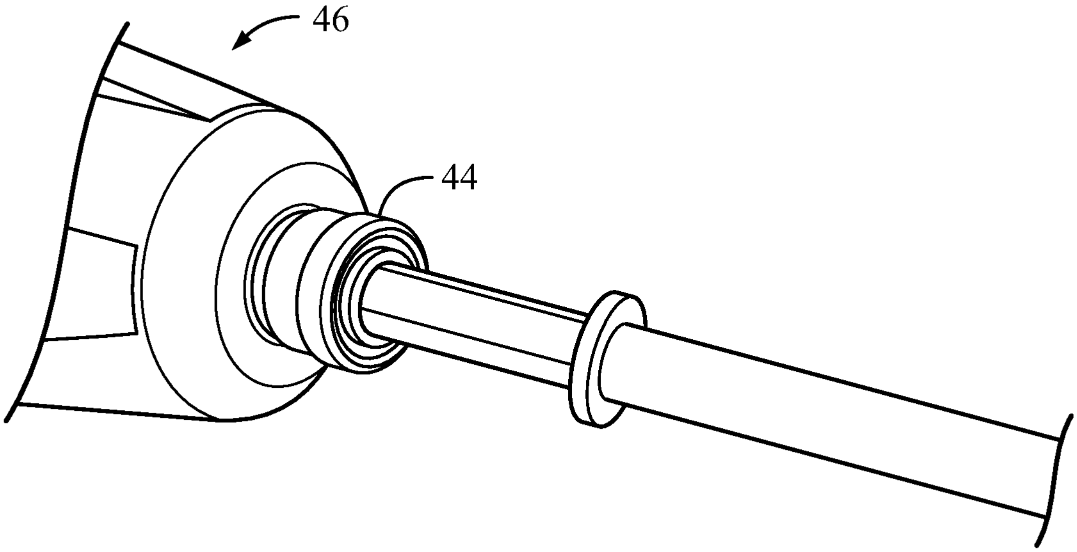
FIG. 7 is an enlarged view of the mixer being attached to the drill shown in FIG. 6.

The mixer 10 may be attached to other types of rotational devices including but not limited to an impact drill, a food mixing device, etc. Referring now to FIG. 6, the mixer 10 is attached to an impact drill 46. FIG. 7 illustrates the proximal end portion 12 being secured to the chuck 44 of the impact drill 46.

Figure 8:
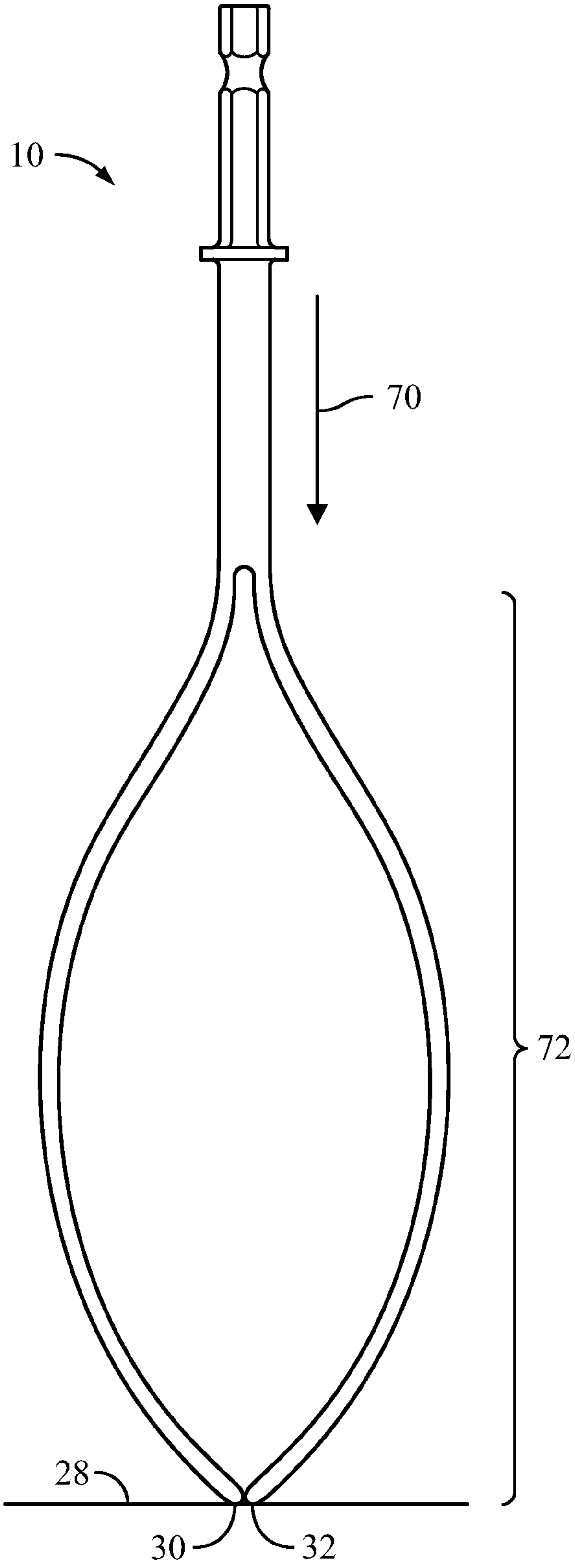
FIG. 8 illustrates the mixer when distal ends of the tines of the mixer presses down on a surface.

Referring now to FIGS. 8-10, the mixer 10 is shown. The mixer may be pushed against a surface 28. Depending on the pressure that the mixer is pushed into and against the surface 28, the tines may be pushed toward each other or criss-cross each other. In this example, the surface 28 is a bottom surface of the container 16. When the distal end 30, 32 is lightly pressed against the surface 28 as shown in FIG. 8 in a downward direction as shown by arrow 70. The distal ends 30, 32 may contact each other. However, when additional pressure is applied in the direction of arrow 70, as shown in FIG. 9 and even greater pressure as shown in FIG. 10, the distal ends may crisscross each other to a greater degree. As further downward pressure is applied in the direction of arrow 70 the tines may further crisscross with each other. Throughout the entire progression, the tines 20, 22 continue to maintain a bulbous configuration in that the tines do not collapse upon each other. The distal end portions 24, 26 rub against the bottom surface 28 of the container 16 to release any caked-on material of the liquid which is semi-adhered or attached to the bottom surface 28 of the container 16. The portion of the tines above the bottom surface 28 identified by reference 72 continue to mix the liquid 16. The tines may cut through the liquid or solidified portions of the liquid to continue liquify the contents of the container. The tines may push the liquid outward and inward depending on the orientation of the tines. In this regard, during use, the user may apply greater and less downward force in the direction of arrow 70 to scrape the bottom surface 28 of the container 16 while additionally also mixing the liquid 18 above the bottom surface 28.

Figure 11:
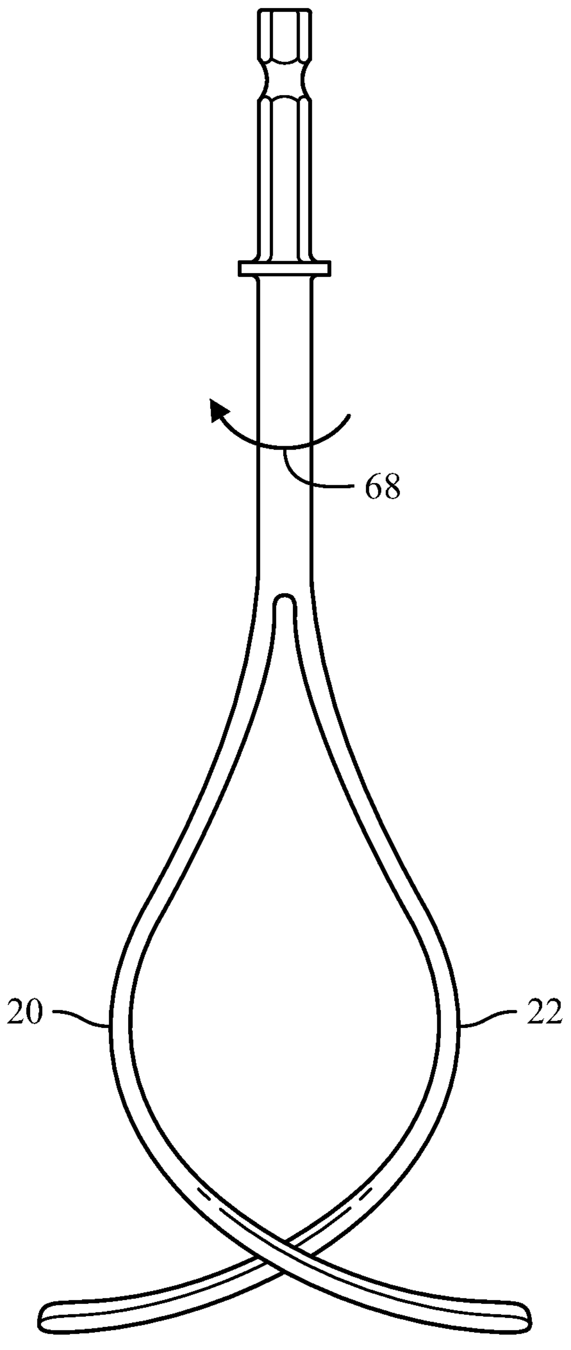
FIG. 11 illustrates the tines of the mixer crisscrossing as downward pressure is applied to the surface by the mixer while the mixer is rotated in the counter-clockwise direction.

Referring now to FIGS. 9 and 11, the tines 20, 22 will crisscross in the direction shown in FIG. 9 when the mixer 10 rotates in the clockwise direction however, when the mixer rotates in the counterclockwise direction 68, as shown in FIG. 11, the tines 20, 22 crisscross in the direction shown in FIG. 11.

Figure 12:
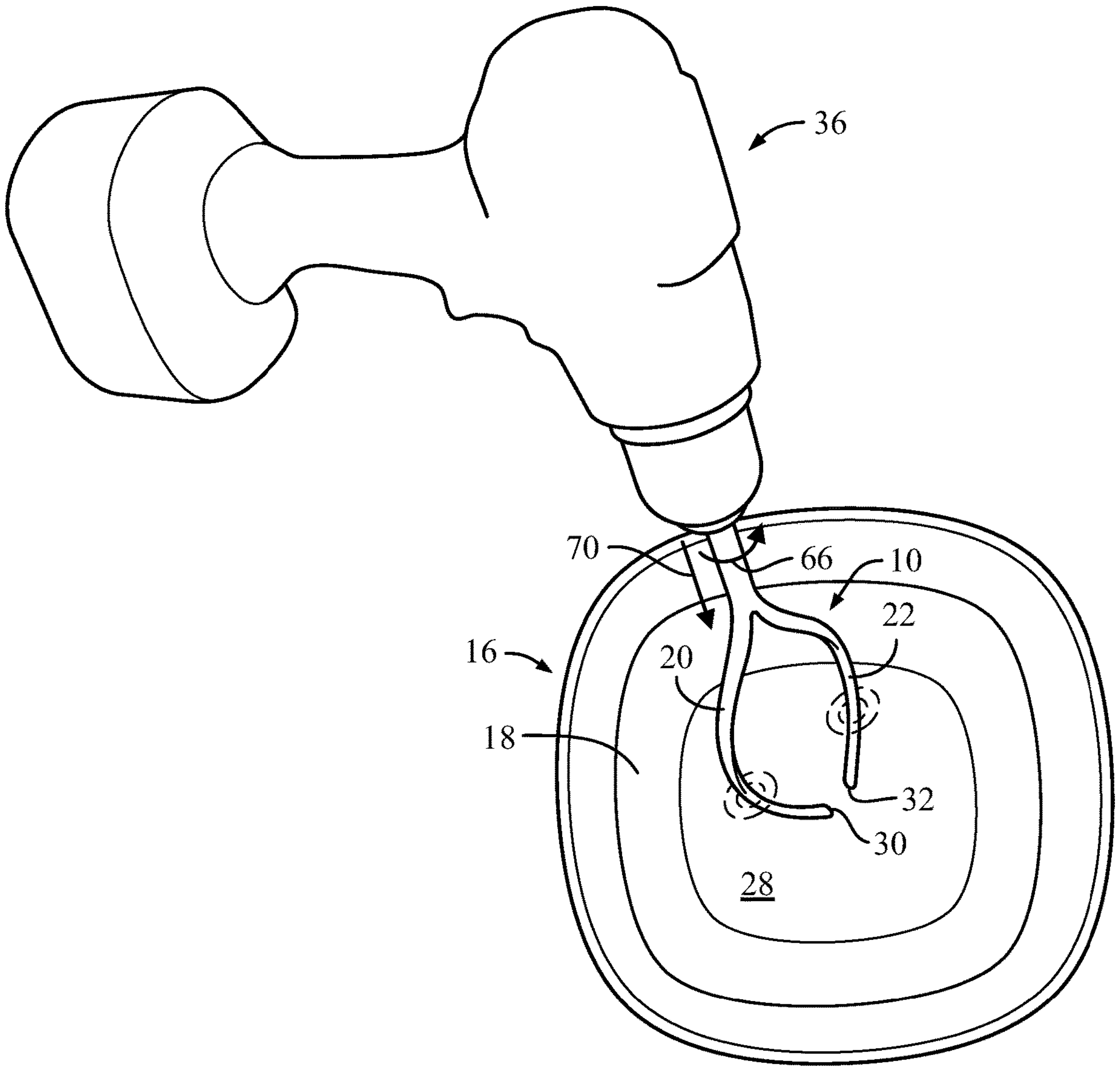
FIG. 12 illustrates the mixer being used to mix liquid and when slight pressure is applied to the bottom surface of a container.
Figure 13:
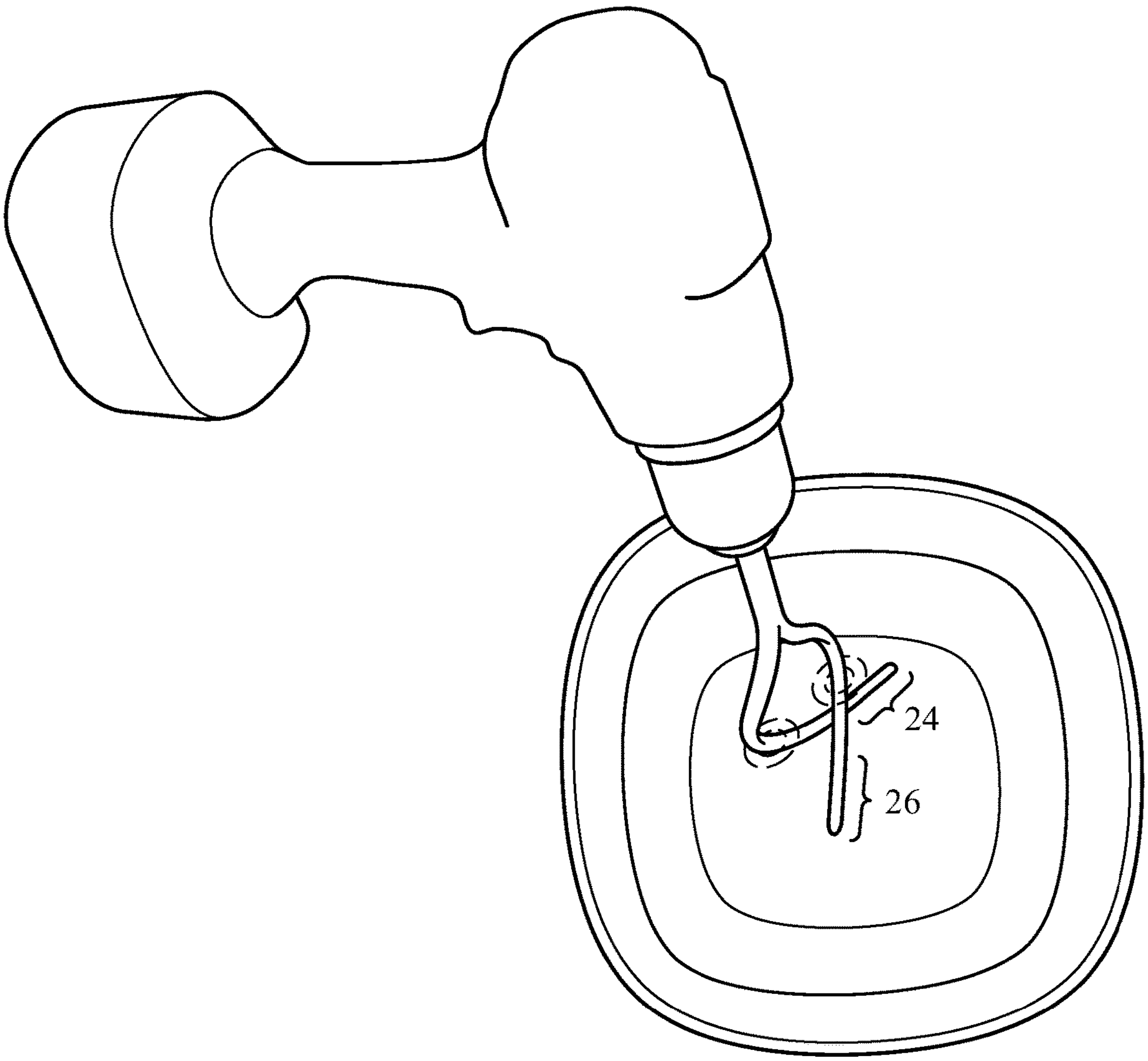
FIG. 13 illustrates the mixer after rotation of the mixer and the tines are crisscrossed.
Figure 14:
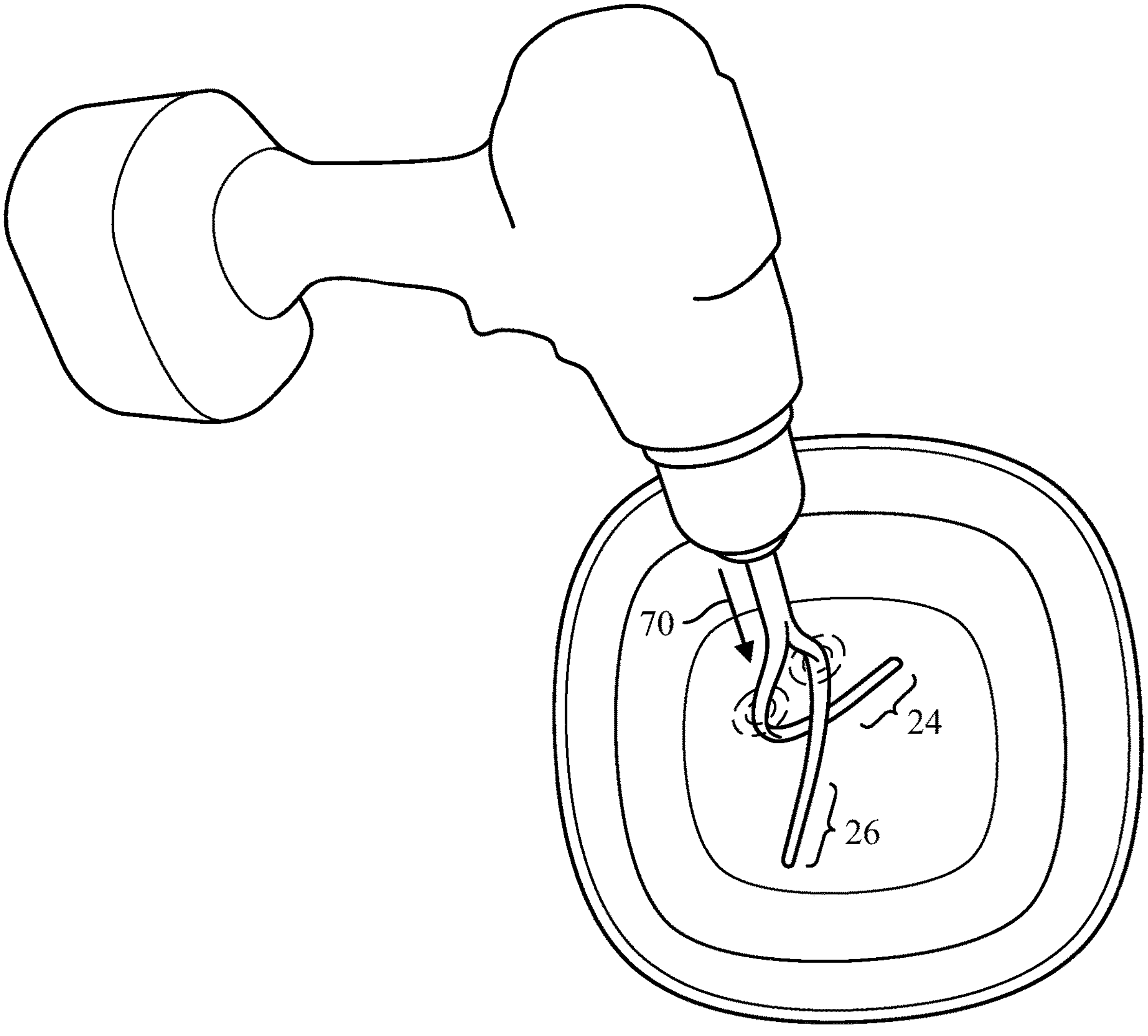
FIG. 14 illustrates increased criss crossing by pushing the mixer closer to the surface of the container.

Referring now to FIGS. 12-14, the mixer 10 may be attached to drill 36. Initially, the distal ends 30, 32 gently contact the bottom surface of the container 16. The drill 36 is set to rotate the mixer 10 in the clockwise direction. The clockwise and counterclockwise direction 66, 68 can be determined by viewing the mixer 10 from the bottom when it is attached to the rotational motor 36, 46 (e.g., drill, impact drill, food mixing device). As the mixer 10 is rotated in the clockwise direction 66, the distal ends remain in place and make the tines 20, 22 crisscross in the direction shown in FIGS. 13 and 14. In order to mix the liquid 16, the user applies varying degrees of downward pressure to engage more or less of the distal end portions of the tines 20, 22 to the bottom surface 28 of the container 16. The user can move the distal end portions 24, 26 along the entire surface of the bottom surface 28. To promote contact of an exterior side of the distal end portions 24, 26 on the bottom surface 28, the exterior sides of the distal end portions may optionally be flat so that the flat exterior side surface of the distal end portions 24, 26 may contact the surface 28.

Additionally, because the tines 20, 22 are flexible and bendable, the user can apply little force or downward force in the direction of arrow 70 so that the distal end portions 24, 26 contact less of the bottom surface 28 of the container 16. In this way, the user can then traverse the distal end portions 24, 26 toward the corners where the bottom surface 28 meet the side walls of the container. While the distal end portions 24 lift up debris that is stuck to the bottom surface, the portion 72 of the tines 20, 22 turbulently mix the liquid 16. In FIGS. 12-14, the opening of the container 16 is wide so that the tines 20, 22 can easily be placed inside of the container.

It is also contemplated that the mixer may be inserted into a small diameter entry hole. Referring now to FIG. 15, the tines 20, 22 may be squeezed together. This allows the mixer 10 to be inserted into a container 16*a* with a small opening hole 74. The hole 74 is considered small because the inside diameter of the hole 74 is less than the width 75 (see FIG. 3) of the mixer when the mixer is in the biased outward curved configuration (see FIG. 1). More particular, the inside surfaces 78, 80 (see FIG. 3) may be flat. To squeeze the tines 20, 22 together as shown in FIG. 15, the user may align the distal ends 30, 32 of the tines 20, 22 to each other with one hand. The other hand may squeeze the tines 20, 22 at around the middle portion (e.g., halfway) of the tines 20, 22 as shown inwardly directed arrows in FIG. 15. The user continues to squeeze the tines 20, 22 together until the inside surfaces 78, 80 of the tines 20, 22 are pushed together as shown in FIG. 15. The container 16*a* may be a bag with a cap that is screwed onto the hole 74 to keep the liquid inside of the container 16*a* from drying out. To mix the contents 18*a* of the container 16*a*, the user removes the cap. The tines 20, 22 are inserted into the hole 74. After the tines 20, 22 are inserted into the bag 16*a*, the tines 20, 22 are biased outward. The mixer 10 may then be rotated in either the clockwise or counterclockwise rotation.

The drawings shown in the figures are proportionally to scale.

The mixer may be fabricated from a hard bendable material such as metal, carbon fiber, and plastic. Metallic material includes but is not limited to aluminum, copper, and steel. Plastic material includes but is not limited to polyethelene terephthalate, high density polyethelene, polyvinyl chloride, low density polyethelene, polypropylene, polystyrene, The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A mixer for mixing liquid contents within a container, the mixer comprising:

first and second tines which are formed in a biased outward position, the first and second tines being fabricated from a bendable material, bases of the first and second tines attached to each other, distal end surfaces of the tines which contact a bottom of the container being closer to each other compared to a vertical midportions of the tines; and a proximal end portion attached to bases of the first and second tines.

2. The mixer of claim 1 wherein the tines are fabricated from a polyethylene material.

3. The mixer of claim 1 wherein the tines are traversable between a biased outward position and a fully compressed inward position, a width of the tines at a vertical midportion of the length of the tines when the tines are at the biased outward position being between 1 inch and 10 inches, a width of the tines at the midportion of the length of the tines when the tines are at the fully compressed inward position being between ⅛ inch and 3 inches.

4. The mixer of claim 1 wherein the distal end portions of the tines have a bulbous configuration.

5. The mixer of claim 1 wherein a length of the first tine is equal to a length of the second tine.

6. The mixer of claim 1 further comprising a shank attached to the proximal portion, the shank sized and configured to be received and fixed to jaws of a drill chuck.

7. The mixer of claim 1 further comprising a tang attached to the proximal portion, the tang sized and configured to be received and fixed to jaws of an impact drill.

8. The mixer of claim 1 wherein the first and second tines have a smooth outer surface to mitigate marring or cutting the container.

9. The mixer of claim 1 wherein the first and second tines have a curved configuration from the proximal portion to the distal end portions of the first and second tines.

10. The mixer of claim 1 wherein at least one of the first and second tines are skewed inward.

11. The mixer of claim 1 wherein at least one of the first and second tines are skewed outward.

12. A method of mixing liquid in a container, the method comprising the steps of:

providing a rotating machine having a chuck;

providing a mixer, the mixer comprising:

first and second tines which are formed in a biased outward position, the first and second tines being fabricated from a bendable material, bases of the first and second tines attached to each other, distal end surfaces of the tines which contact a bottom surface of the container being closer to each other compared to a vertical midportions of the tines;

a proximal end portion attached to bases of the first and second tines;

attaching a proximal end portion of the mixer to the chuck of the rotating machine;

disposing the mixer into the container filled with the liquid;

rotating the mixer with the rotating machine to mix the liquid in the container.

13. The method of claim 12 further comprising a step of pressing the distal end portions of the tines against an inner surface of the container.

14. The method of claim 12 further comprising a step of varying pressure of the distal end portions of the tines against a bottom surface of the container for criss crossing the tines to varying degrees.

15. The method of claim 12 wherein in the providing the mixer step, the first and second tines have a curved configuration from the proximal portion to the distal end portions of the first and second tines.

16. The method of claim 12 wherein in the providing the mixer step, at least one of the first and second tines are skewed inward.

17. The method of claim 12 wherein in the providing the mixer step, at least one of the first and second tines are skewed outward.

18. The method of claim 12 further comprising a step of criss crossing distal end portions of the tines for scraping a bottom surface of the container.

19. The method of claim 18 further comprising a step of pressing the mixer further into the container.

* * * * *